United States Patent [19]

Ogura et al.

[11] Patent Number: 4,827,200
[45] Date of Patent: May 2, 1989

[54] VELOCITY CONTROL UNIT OF DETECTING HEAD

[75] Inventors: Shirou Ogura; Shigemasa Yoshida, both of Kamakura, Japan

[73] Assignee: Mitsubishi Denki K.K., Tokyo, Japan

[21] Appl. No.: 176,774

[22] Filed: Apr. 1, 1988

[30] Foreign Application Priority Data

Apr. 3, 1987 [JP] Japan .................................. 62-82671

[51] Int. Cl.⁴ ............................................. G05B 13/00
[52] U.S. Cl. .................................... 318/561; 318/628; 318/696; 318/685; 360/78.06
[58] Field of Search ............... 318/561, 628, 696, 685; 360/77

[56] References Cited

U.S. PATENT DOCUMENTS

| | | | |
|---|---|---|---|
| 4,133,011 | 1/1979 | Kurzweil, jr. ................. | 318/561 X |
| 4,200,827 | 4/1980 | Oswald ............................... | 318/561 |
| 4,337,428 | 6/1982 | Oltendorf ........................... | 318/696 |
| 4,469,996 | 9/1984 | Oltendorf ........................... | 318/696 |
| 4,535,372 | 8/1985 | Yeaklez ............................. | 360/77 |
| 4,594,622 | 6/1986 | Wallis ............................. | 318/561 X |

OTHER PUBLICATIONS

R. K. Oswald, "Design of a Disk File Head-Positioning Servo," *IBM J. Res. Develop.*, pp. 506–512, Nov. 1976.

Primary Examiner—William M. Shoop, Jr.
Assistant Examiner—Saul M. Bergmann
Attorney, Agent, or Firm—Takeuchi Patent Office

[57] ABSTRACT

A velocity control unit of a detecting head consists of a differentiation circuit for differentiating a reference velocity signal and feeding it via an analog switch to a first-order lag circuit which generates a feedforward signal. The analog switch is controlled by a constant velocity/deceleration detecting circuit so that it may be turned on in the constant velocity/deceleration period of the head.

5 Claims, 9 Drawing Sheets

HIGH GAIN OPERATION

REDUCED GAIN OPERATION

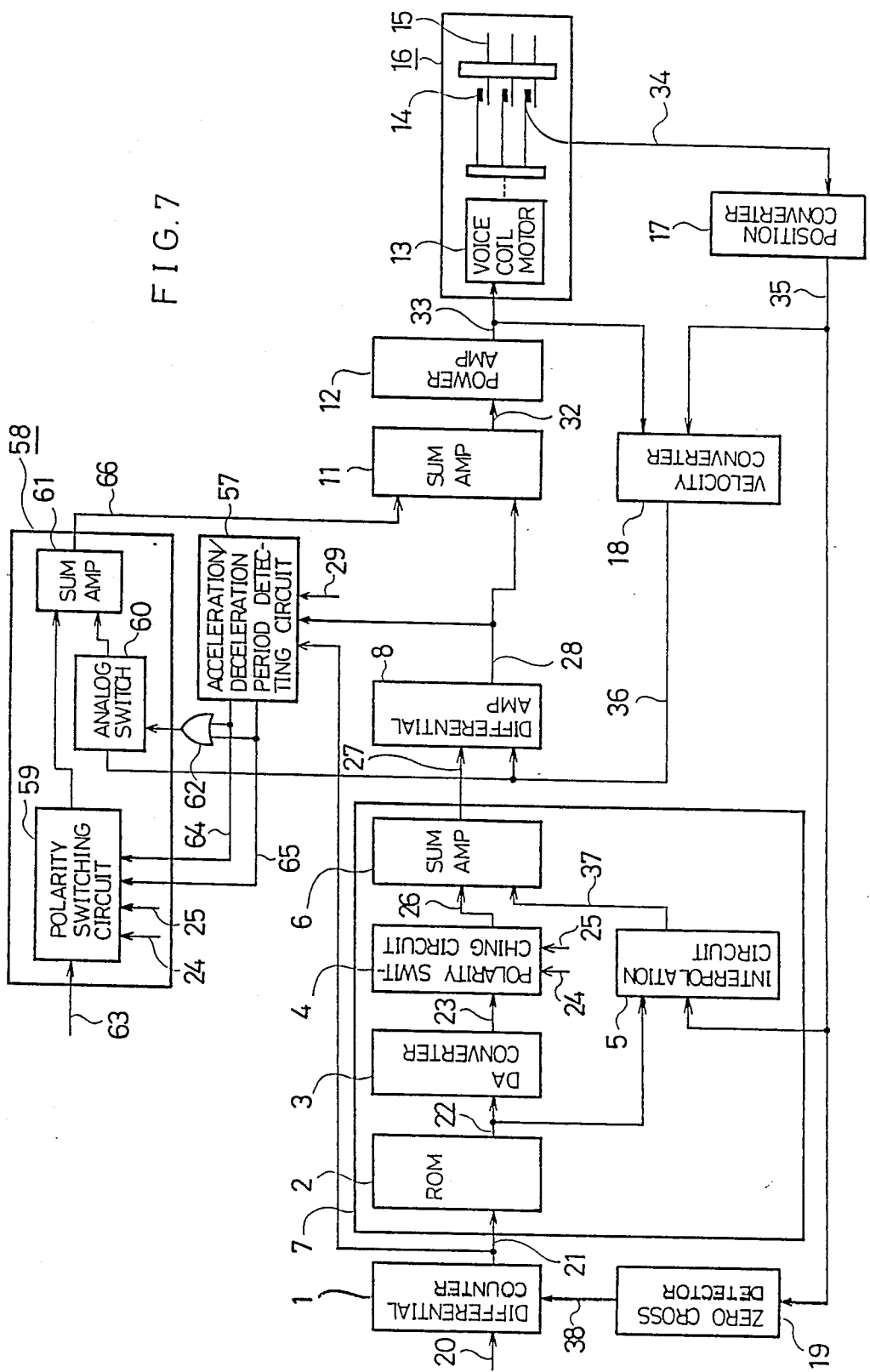

VELOCITY CONTROL UNIT OF DETECTING HEAD

BACKGROUND OF THE INVENTION

The present invention relates to apparatus for controlling the velocity of a detecting head for use in laser or magnetic disk devices.

In order to perform a seek operation in which the detecting head of a laser or magnetic disk device is moved from the present track to the target track, it is a common practice to employ a feedback control of the head velocity. A typical example of such a feedback control is described by R. K. Oswald in IMB Journal of Research and Development, November 1984. In this feedback control, both a reference signal designed to decrease as the head approaches the target track and an actual velocity signal proportional to an actual or measured velocity of the magnetic head are applied to a differential amplifier to produce an error signal. This error signal is converted in a power amplifier to an electric current, which drives a voice coil motor to perform velocity control of the magnetic head. Thus, the actual velocity is made as close as possible to the reference velocity. Since the head velocity is low in the initial period, the maximum current is supplied to the voice coil motor from the power amplifier in the acceleration period (open loop control). Then, small velocity errors are produced in the constant velocity and deceleration periods, and the velocity control is performed under the closed conditions.

The velocity control unit of a magnetic disk device such as described above may be represented by a model such as shown in FIG. 6(a), wherein Ka is the gain of a differential amplifier, Kp the gain of a power amplifier, Kf the force constant of a voice coil motor, M the effective mass of a movable part, Kv the velocity-voltage conversion coefficient, Vr the reference velocity, $V_H$ the head velocity, I the output current of the power amplifier, and S Laplace complex variable. The model of FIG. 6(a) may be simplified as shown in FIG. 6(b), wherein Kc = Kv × Ka,
Ks = (Kp × Kf)/M, and
Verr = velocity error.

Separate Kc and Ks are provided in order to make simple a comparison with the model to which a feedforward control is provided as described below.

The head velocity $V_H$ with respect to the reference velocity Vr is given by $$V_H = \frac{KcKs}{S + KcKs} \cdot Vr \quad (1)$$

The velocity error Verr is given by $$Verr = Vr - V_H = \frac{S}{S + KcKs} Vr \quad (2)$$

Since the reference velocity Vr is a ramp input in the deceleration period, if $$Vr = \frac{a}{S^2} \quad (3)$$

then, the constant velocity error Verr is given by $$Verr = \lim_{S \to 0} S \cdot \frac{S}{S + KcKs} \cdot \frac{a}{S^2} = \frac{a}{KcKs} \quad (4)$$

Thus, it cannot be zero. When the velocity error in the deceleration period is large, the rush velocity into the target track becomes too large to provide satisfactory settling. In order to minimize the velocity error, it is necessary to increase the loop gain KcKs of the system. However, too much large loop gains make the system oscilate and unstable because of a mechanical resonance point of several kHz of the movable part.

As Japanese Patent Kokai No. 54-12082 (hereinafter "the '082 patent") discloses, an advanced magnetic disk devices employing a feedforward control system in which a power amplifier input signal necessary for the velocity control of the magnetic head is generated separately from a velocity error signal and applied to the power amplifier. This system is aimed at minimizing the velocity error without increasing the loop gain, thus providing high-precision velocity control. The velocity control unit as described above is shown in a block diagram of FIG. 7.

In the '082 patent, as shown in FIG. 8, the feedforward signal C (solid line) for the power amplifier is generated by subtracting the actual or measured velocity signal A from the constant dc voltage B in the acceleration period and from the negative dc voltage D in the deceleration period.

However, as Japanese Patent Kokai No. 61-39985 (hereinafter "the '985 patent") points out, if the velocity profile (characteristic curve) is selected such that the feedforward signal waveform agrees with the power amplifier input waveform necessary for velocity control of the magnetic head, the acceleration in the deceleration period is represented by a curve E as shown in FIG. 9(b), and the velocity at this time is represented by a line G in FIG. 9(a). For this reason, as shown by an acceleration F (broken line) in FIG. 9(b), changes of the velocity near the target track becomes greater than those of a velocity profile H in which the acceleration decreases near the target track, thus increasing the velocity error, resulting in poor settling.

In order to cope with such problems, the '985 patent has proposed the use of a read only memory (ROM) and a DA converter to generate a more flexible feedforward signal than before.

FIG. 10 shows a schematic diagram of the proposed circuit. A differential counter 1 holds the number of tracks between the target track and the present track before a magnetic head 14 is moved and is decremented by one when the magnetic head 14 moves across one track. The binary output 21 from the differential counter 1 is applied to a ROM 39 and a reference velocity signal generator 7. The reference velocity sinal generator 7 receives a logic signal 24 or 25 indicative of either forward or backward movement and generates a reference velocity signal 27 with a polarity corresponding to the moving direction. A differential amplifier 8 receives the reference velocity signal 27 and the actual velocity signal 36 from a velocity converter 18 and generates a velocity error signal 28. A sum addition amplifier 11 sums up the velocity error signal 28 and the feedforward signal 49 of an analog switch 43 and feeds a power amplifier 12 with a driving signal 32. The power amplifier 12 supplies a voice coil motor 13 with an electric current proportional to the input driving signal 32 to drive the movable part on which the magnetic head 14 is mounted.

On the other hand, in response to the binary output 21 from the differential counter 1, the ROM 39 generates a binary data 45 of a predetermined profile proportional to the necessary feedforward signal 49 and feeds it to a DA converter 40. The DA converter 40 converts the binary data 45 from the ROM 39 into an analog voltage 46 and feeds it to a polarity switching circuit 41. The polarity switching circuit 41 receives a logic signal 24 or 25 indicative of the forward or backward movement and switches the output 46 from the DA converter 40 and feeds it to an analog switch 43. Upon reception of a logic signal 48 indicative of the deceleration period, the analog switch 43 turns on and feeds the sum amplifier 11 with the feedforward signal 49.

In the above conventional velocity control unit, the ROM 39 and the DA converter 40 are used to generate the feedforward signal 49 so that there is a high degree of freedom in selection of the velocity profile. However, the feedforward signal is discrete (stepwise), thus failing to provide smooth movement of the magnetic head. In addition, the feedforward signal is defined as a function of the number of tracks between the present position and the target track so that it is difficuolt to determine such a function that is able to assure appropriate feedforward control for every seek span. In order to solve this problem, it is possible to modify the feedforward function according to the seek span. However, this modification makes the circuit more complicated and expensive than before.

SUMMARY OF THE INVENTION

Accordingly, it is an object of the present invention to provide a high-precision feedforward control system without impairing smooth movement of the magnetic head and degrees of freedom in selection of the velocity profile.

It is another object to provide a high-precision feedforward control system made up of inexpensive circuitry.

According to the invention there is provided an apparatus for controlling the velocity of a detecting head for performing seek operation by quickly moving the detecting head from a present position to a target track, which includes a reference velocity signal generator for generating a reference velocity signal corresponding to the number of tracks between the target track and the present position of the detecting head; a velocity converter for generating an actual velocity signal proportional to a measured velocity of the detecting head; a differential circuit for receiving the reference velocity signal and the actual velocity signal and generating a velocity error signal; a constant velocity/deceleration period detecting circuit for receiving the velocity error signal and generating a logic signal indicative of a constant velocity/deceleration period in the seek operation; a feedforward signal generator in response to the logic signal to differentiate the reference velocity signal, forming a first-order lag feedforward signal; a sum amplifier for receiving the velocity error signal and the feedforward signal and generating a driving signal; and a power amplifier for receiving the driving signal and supplying an electric current for driving a voice coil motor to which the detecting head is secured.

Other objects, features, and advantages of the invention will be apparent from the following description taken in conjunction with the accompanying drawings.

BRIEF DESCRIPTION OF THE DRAWINGS

FIG. 7 is a block diagram of a conventional velocity control unit with a feedforward control;

DESCRIPTION OF THE PREFERRED EMBODIMENTS

Figure 1:
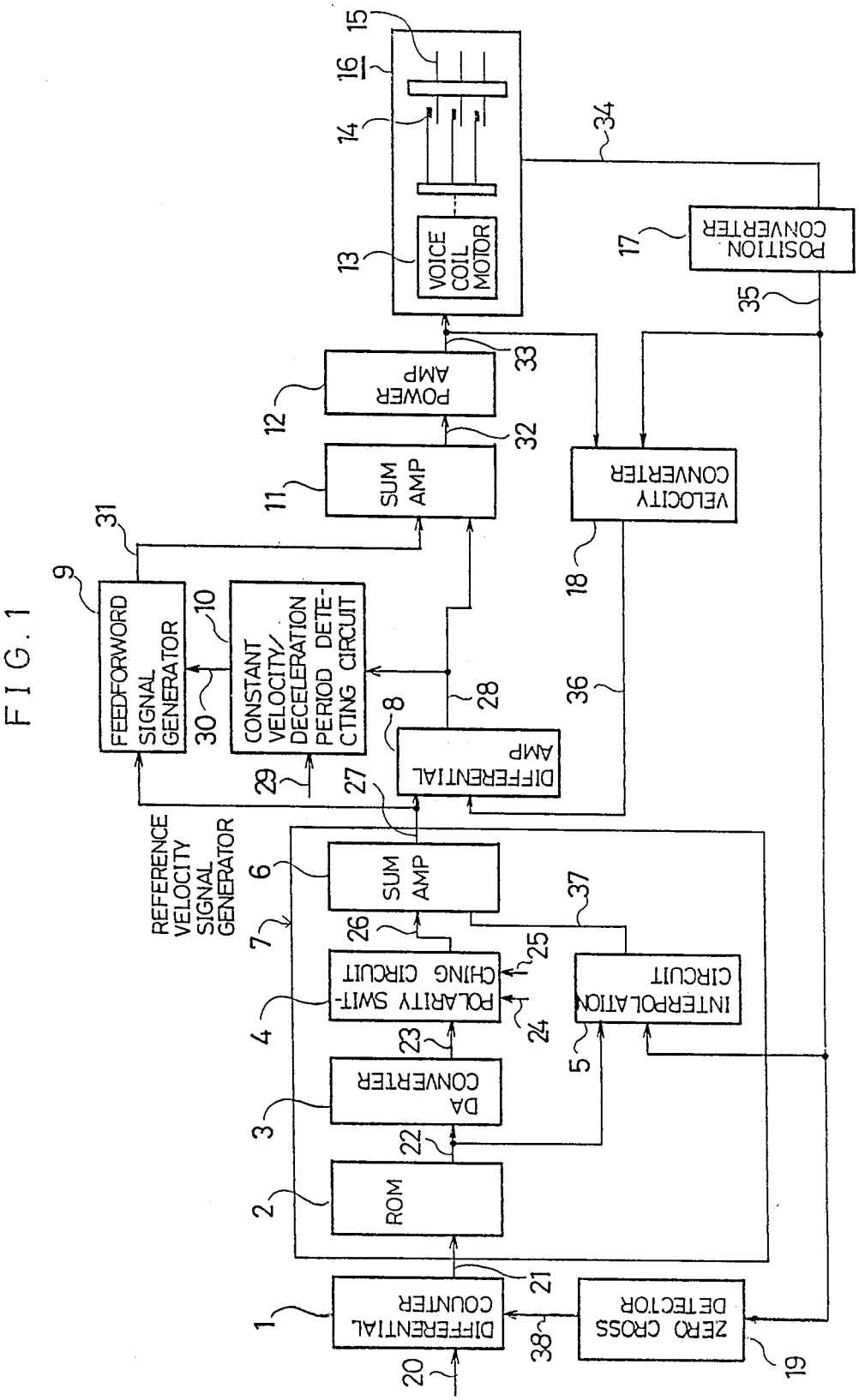
FIG. 1 is a block diagram of a velocity control unit according to an embodiment of the invention.

In FIG. 1, the number of tracks between the target track and the present track before a magnetic head 14 is moved is set at a differential counter 1. The number is decremented by one every time the magnetic head 14 moves across a track. The binary output 21 from the differential counter 1 is applied to a reference velocity signal generator 7. The reference velocity signal generator 7 receives a logic signal 24 or 25 indicative of a forward or backward movement and feeds a differential amplifier 8 and a feedforward signal generator 9 with a reference velocity signal 27 having a polarity corresponding to the moving direction. In the reference velocity signal generator 7, an interpolation circuit 5 generates an interpolation signal 37 based on a position signal 35 and feeds it to a sum amplifier 6 to interpolate a discrete output 23 from a ROM 2. Consequently, the reference velocity signal 27 becomes a smoothed continuous signal. The differential amplifier 8 receives the reference velocity signal 27 and the actual velocity signal 36 from a velocity converter 18 to generate and feed a velocity error signal 28 to a sum amplifier 11. The sum amplifier 11 sums up the velocity error signal 28 and a feedforward signal 31 from the feedforward signal generator 9 to feed a driving signal 32 to a power amplifier 12. The power amplifier 12 supplies a voice coil motor 13 with an electric current 33 proportional to the input driving signal 32 to drive a movable part of the magnetic head 14.

Figure 2:
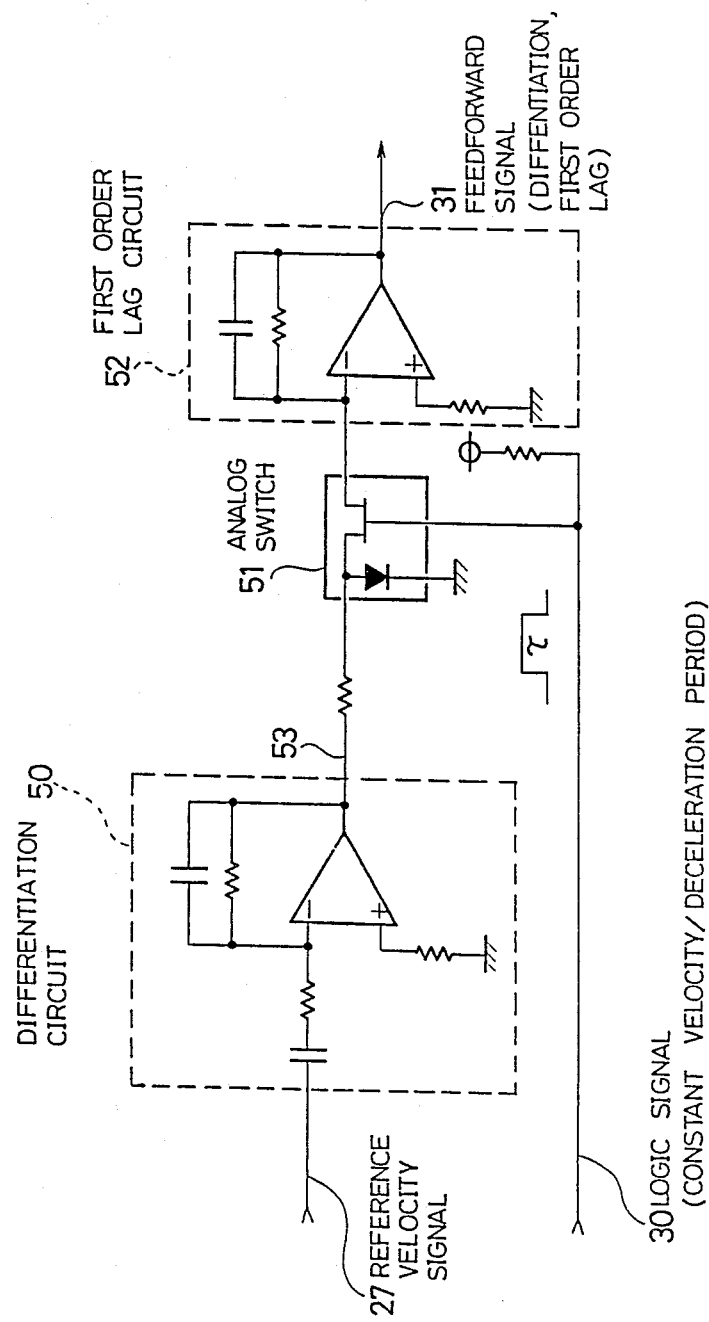
FIG. 2 is a schematic diagram of a feedforward signal generator useful for the unit of FIG. 1.

In FIG. 2 there is shown the feedforward signal generator 9 in which a differentiation circuit 50 receives the reference velocity signal 27 and generates a differentiation signal 53. Upon reception of a logic signal 30 indicative of a constant velocity/deceleration period output from a constant velocity/deceleration period detecting circuit 10, an analog switch 51 turns on so that the differential signal 53 is applied to a first-order lag circuit 52. Thus, the differentiation, first-order lag reference velocity signal 27 is output as a feedforward signal 31 in the constant velocity/deceleration period. In the constant velocity period, the differentiation value of the reference velocity signal is O so that the feedforward signal 31 is also O.

The differentiation circuit 50 and the first-order lag circuit 52 are made up of a differential amplifier as shown in FIG. 2. The time constant is determined by the values of a capacitor and a resistor which feed the output of the differential amplifier back to the input. The analog switch 51 is made up of a field effect transistor as shown in FIG. 2.

Figure 3:
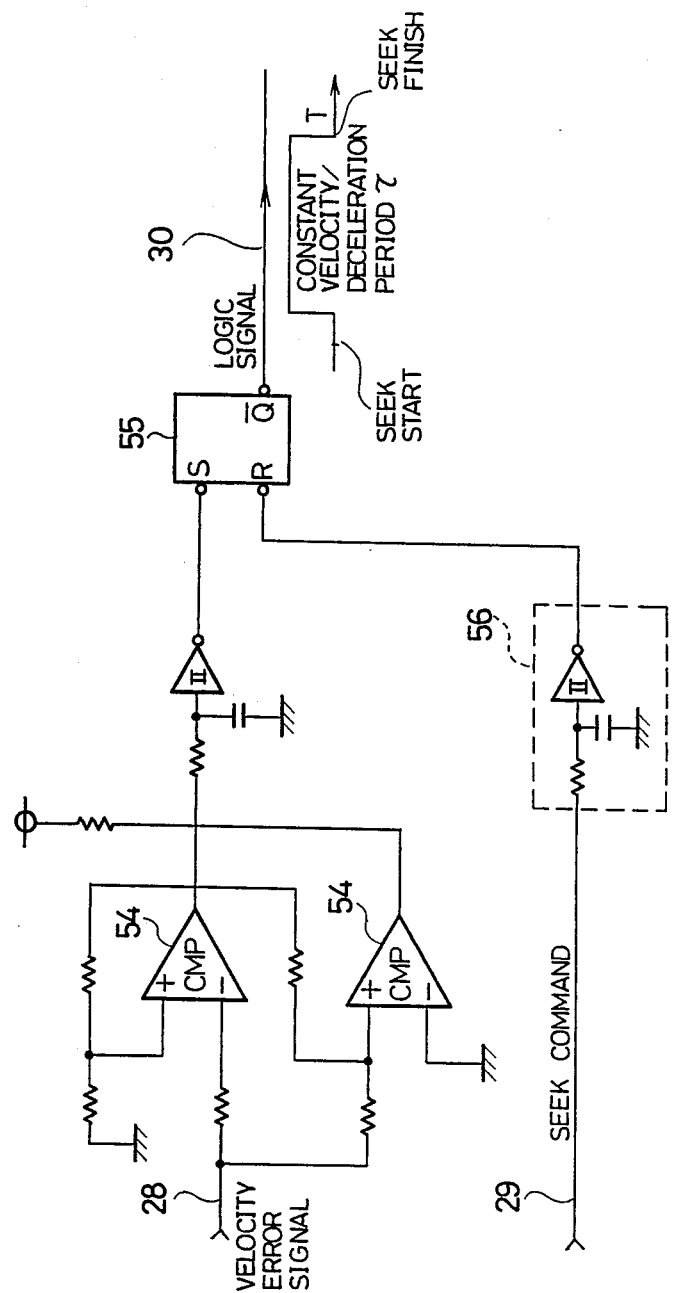
FIG. 3 is a schematic diagram of a constant velocity/deceleration period detecting circuit useful for the unit of FIG. 1.

In FIG. 3 there is shown the constant velocity/deceleration period detecting circuit 10 in which a flip-flop 55 for generating a logic signal 30 indicative of a constant velocity/deceleration period is kept reset except during the seek operation. Upon reception of a seek command 29 delayed by a predetermined time in a delay circuit 56, the flip-flop 55 is released from the reset. On the other hand, the sign of the velocity error signal 28 is inverted at the end of acceleration period. A pair of comparators 54 sense this inversion and sets the flip-flop 55. Thus, the flip-flop 55 generates a logic signal 30 indicative of a constant velocity/deceleration period between the end of acceleration and the end of seek operation.

The operation of the circuit of FIG. 2 will be described using mathematical expressions and figures.

Figure 4A:
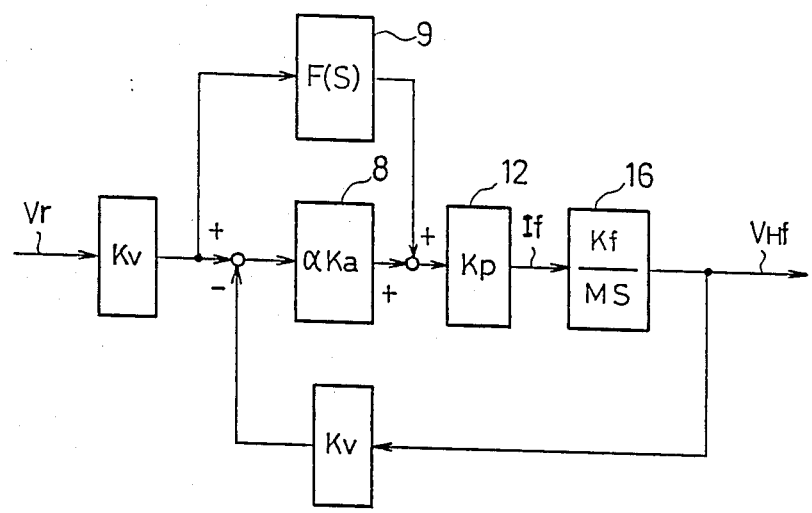
FIGS. 4(a) and 4(b) are block diagrams of a mathematical model according to the invention.

In FIG. 4(a) there is shown a logic block diagram of the velocity control unit for a magnetic disk device according to the invention, in which Kp is the gain of the power amplifier, Kf the force constant of the voice coil motor, M the effective mass of the movable part, Kv the velocity/voltage conversion coefficient, Vr the reference velocity, $V_{Hf}$ the head velocity, If the output current from the power amplifier, and S Laplace complex variable for differentiation. The net gain of the differential amplifier 8 is reduced to Ka, wherein Ka is the gain of the differential amplifier 8 and $\alpha$ is the gain coefficient ($0 < \alpha < 1$). F(s) is the transfer function of the feedforward signal generator 9 and of the differentiation, first-order lag type.

Figure 4B:
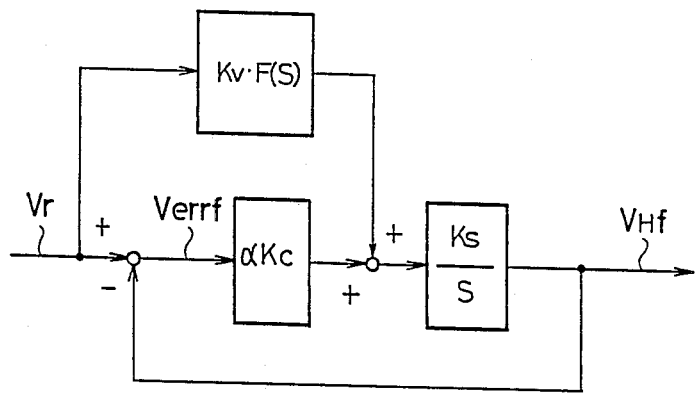

In FIG. 4(b) there is shown a simplified model of FIG. 4(a), in which $Kc = Kv \times Ka$, $Ks = (Kp \times Kf)/M$, and $V_{err_f}$ = velocity error. In this diagram, the magnetic head velocity $V_{Hf}$ is given by $$V_{Hf} = \frac{\alpha KcKs + KvKsF(s)}{S + \alpha KcKs} V_r \quad (5)$$

The velocity error $V_{err_f}$ is given by $$V_{err_f} = V_r - V_{Hf} = \frac{S - KvKsF(s)}{S + \alpha KcKs} V_r \quad (6)$$

Let the transfer function F(s) be of the differentiation, first-order lag type $$F_s = \frac{1-\alpha}{KvKs} \cdot \frac{S}{1 + \frac{1}{KcKs}S} \quad (7)$$

Substitution of Eq. (7) into Eq. (6) yields $$V_{err_f} = \frac{S}{S + KcKs} V_r \quad (8)$$

This is equal to the velocity error Verr in the prior art feedback control as given by Eq. (2). Thus, even if the gain of the differential amplifier is reduced to $\alpha Ka$ or the loop gain of the system is reduced by $\alpha$ time, the use of such a feedforward function as given by Eq. (7) makes it possible to operate the system in the same velocity profile as in the high gain operation.

Figure 5A:
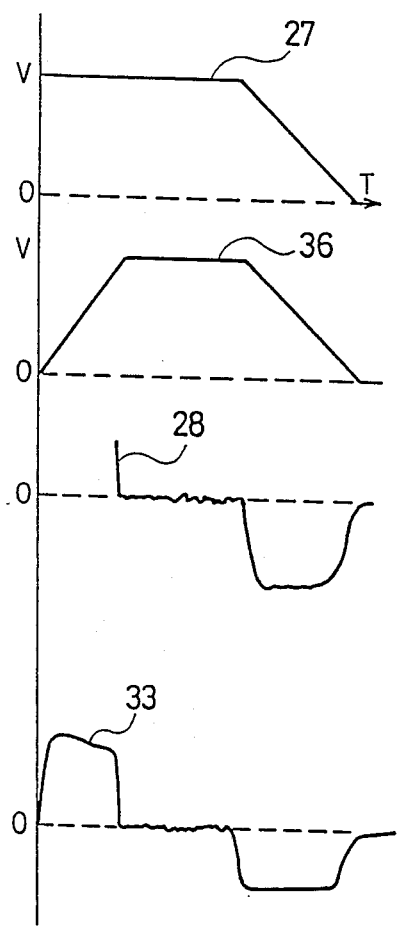
FIGS. 5(a) and 5(b) show various signal waveform in the seek operation.
Figure 5B:
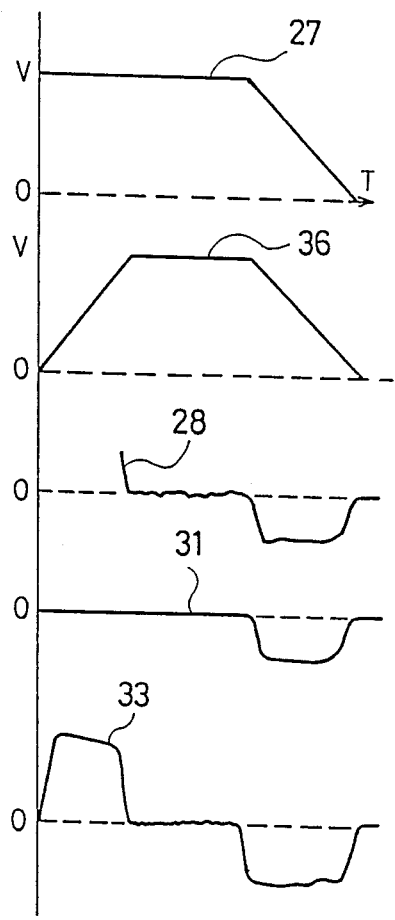
Figure 6A:
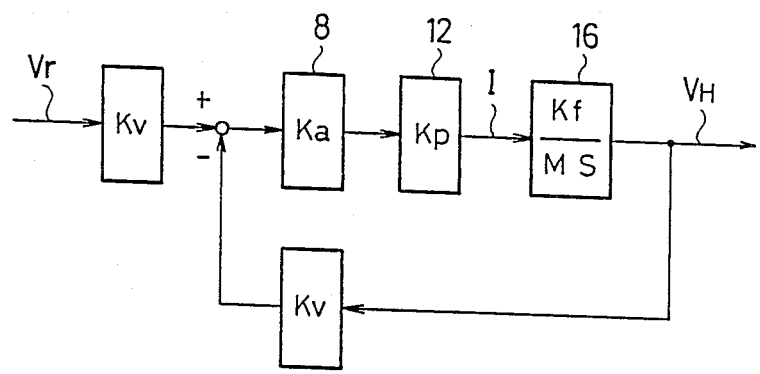
FIGS. 6(a) and 6(b) are block diagrams of a mathematical model of a conventional velocity control unit with a feedback control.
Figure 6B:
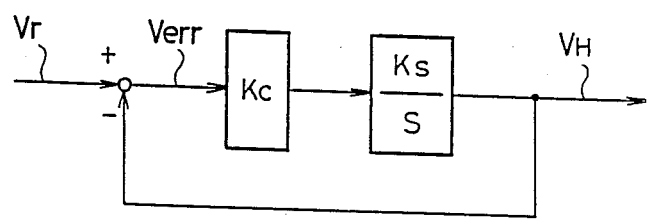
Figure 8:
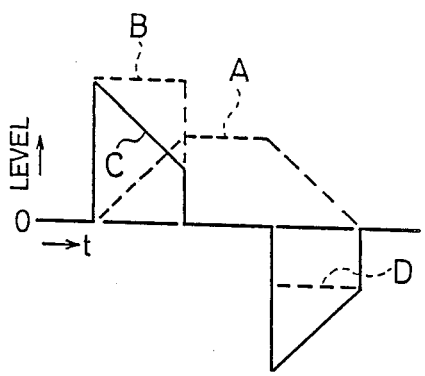
FIG. 8 shows a feedforward signal according to the prior art.
Figure 9A:
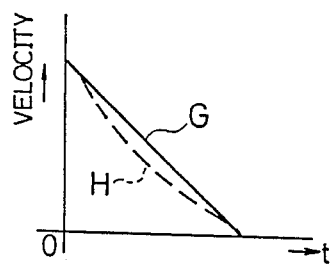
FIGS. 9(a) and 9(b) show characteristic profiles in the conventional feedforward control.
Figure 9B:
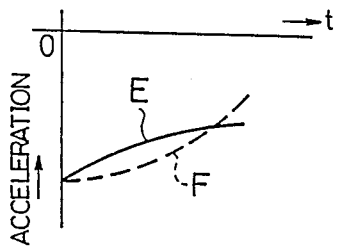
Figure 10:
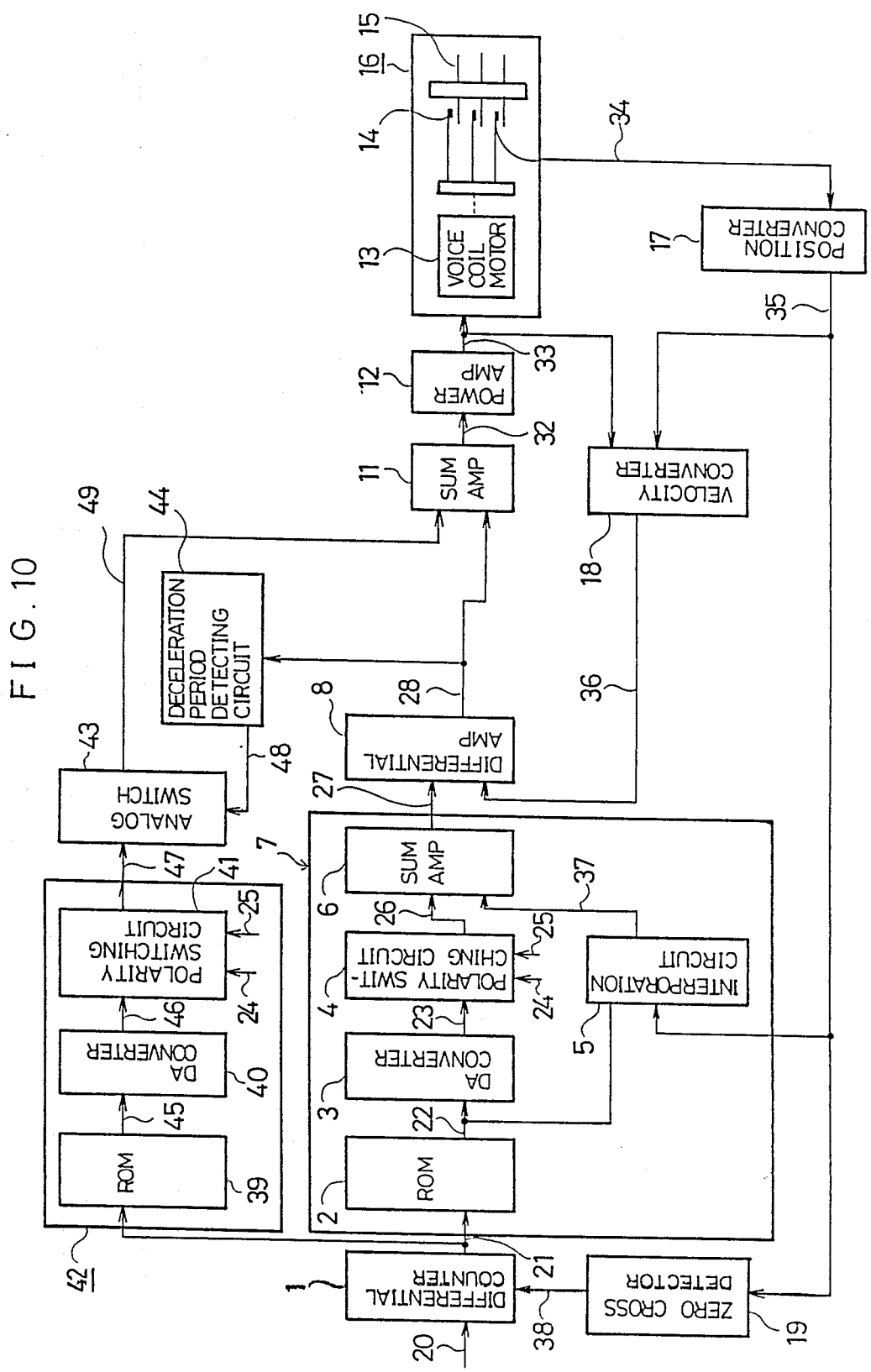
FIG. 10 is a block diagram of another conventional feedforward control.

FIGS. 5(a) and 5(b) show various signal waveforms for comparison. The horizontal axis represents time. FIG. 5(a) shows the top to bottom the reference velocity signal 27, the actual velocity signal 36, the velocity error signal 28 amplified in the differential amplifier 8, and the current 33 flowing through the voice coil motor in the seek operation under the high gain feedback control. FIG. 5(b) shows respective waveforms when the feedforward signal 31 is added, and the gain of the differential amplifier 8 is reduced by 0.5 time ($\alpha = 0.5$). A comparison of these two sets of waveforms indicates that when the velocity error signal 28 is amplified, with $\alpha = 0.5$, to provide a driving signal for moving the magnetic head, the feedforward signal 31 may be set so as to provide the remaining 50% of the driving signal. Thus, even if the loop gain of the system is reduced by 50%, it is possible to perform seek operation in the same velocity profile as in the prior art.

By making use of this feature or by setting the feedforward function as Eq. (7), it is possible without increasing the loop gain to provide high-precision velocity control which has been impossible to achieve because of the mechanical resonance problem in high loop gain operation. The reference velocity signal generator 7 may be designed in the same way as in the prior art feedback control without being restricted by the feedforward signal 31, thus maintaining the same degree of freedom in velocity profile selection as in the prior art. The present invention is applicable to the velocity control of a laser or optical disk head as well as a magnetic head.

While a preferred embodiment of the invention has been described using specific terms, such description is given for illustrative purposes only, and it is to be understood that changes and variations may be made without departing from the spirit and scope of the invention as recited in the appended claims.

What is claimed is:

1. An apparatus for controlling the velocity of a detecting head for performing a seek operation by quickly moving said detecting head from a present position to a target track, which comprises:

a reference velocity signal generator for generating a reference velocity signal corresponding to the number of tracks between said target track and said present position of said detecting head;

a velocity converter for generating an actual velocity signal proportional to a measured velocity of said detecting head;

a differential circuit for receiving said reference velocity signal and said actual velocity signal and generating a velocity error signal;

a constant velocity/deceleration period detecting circuit for receiving said velocity error signal and generating a logic signal indicative of a constant velocity/deceleration period in said seek operation;

a feedforward signal generator in response to said logic signal to differentiate said reference velocity signal, forming a first-order lag feedforward signal;

a sum amplifier for receiving said velocity error signal and said feedforward signal and generating a driving signal; and a power amplifier for receiving said driving signal and supplying an electric current for driving a voice coil motor to which said detecting head is secured.

2. The apparatus of claim 1, wherein said feedforward signal generator comprises:

a differentiation circuit for receiving said reference velocity signal and generating a differentiation signal;

an analog switch in response to said logic signal to open or close; and a first-order lag circuit for lagging said differentiation signal.

3. The apparatus of claim 1, wherein said differentiation circuit and said first-order lag circuit are made up of a dc differential amplifier.

4. The apparatus of claim 1, wherein said analog switch is made up of a field effect solid-state switch.

5. The apparatus of claim 1, wherein said constant velocity/deceleration period detecting circuit comprises:

a delay circuit for delaying a seek command;

a pair of comparators for sensing inversion of a sign of said velocity error signal; and a flip-flop for receiving an output from said delay circuit at its reset terminal and an output from said comparators at its set terminal and generating a logic signal at its output terminal.

* * * * *